(12) United States Patent
Komatsu et al.

(10) Patent No.: US 8,809,465 B2
(45) Date of Patent: Aug. 19, 2014

(54) THERMOPLASTIC RESIN PELLETS AND METHOD FOR PREPARING SAME

(75) Inventors: Ikuo Komatsu, Kanagawa (JP); Yoshiko Narikawa, Kanagawa (JP); Yuji Yamaguchi, Kanagawa (JP); Hiroaki Goto, Kanagawa (JP)

(73) Assignee: Toyo Seikan Kaisha, Ltd, Tokyo (JP)

( * ) Notice: Subject to any disclaimer, the term of this patent is extended or adjusted under 35 U.S.C. 154(b) by 790 days.

(21) Appl. No.: 12/527,721

(22) PCT Filed: Feb. 14, 2008

(86) PCT No.: PCT/JP2008/052444
§ 371 (c)(1),
(2), (4) Date: Aug. 19, 2009

(87) PCT Pub. No.: WO2008/102690
PCT Pub. Date: Aug. 28, 2008

(65) Prior Publication Data
US 2010/0048825 A1 Feb. 25, 2010

(30) Foreign Application Priority Data

Feb. 19, 2007 (JP) ................................ 2007-037584

(51) Int. Cl.
*C08L 23/04* (2006.01)
*C08J 3/20* (2006.01)
*C08L 23/08* (2006.01)
*C08K 5/098* (2006.01)

(52) U.S. Cl.
CPC .............. *C08J 3/201* (2013.01); *C08J 2323/08* (2013.01); *C08L 23/0815* (2013.01); *C08K 5/098* (2013.01); *C08L 23/04* (2013.01)
USPC .......... 525/388; 525/360; 525/383; 526/352.2

(58) Field of Classification Search
CPC . C08J 3/201; C08J 2323/08; C08L 123/0815; C08L 123/04; C08K 5/098
USPC .......... 525/17, 370, 360, 383, 388; 526/352.2
See application file for complete search history.

(56) References Cited

U.S. PATENT DOCUMENTS

| 5,346,644 A | 9/1994 | Speer et al. |
|---|---|---|
| 5,350,622 A | 9/1994 | Speer et al. |
| 5,399,289 A | 3/1995 | Speer et al. |
| 5,529,833 A | 6/1996 | Speer et al. |
| 5,700,554 A | 12/1997 | Speer et al. |
| 8,232,347 B2 | 7/2012 | Ishihara et al. |
| 2005/0142373 A1 | 6/2005 | Komatsu et al. |
| 2008/0152915 A1* | 6/2008 | Ishihara et al. ............... 428/407 |
| 2010/0133468 A1* | 6/2010 | Ishihara et al. .......... 252/188.28 |

FOREIGN PATENT DOCUMENTS

| JP | 62-1824 B2 | 7/1980 |
|---|---|---|
| JP | 05-051049 A1 | 3/1993 |
| JP | 05-115776 A1 | 5/1993 |
| JP | 08-502306 A1 | 4/1994 |
| JP | 2001-039475 A1 | 2/2001 |
| JP | 2004-269735 A1 | 9/2004 |
| JP | 2005-137996 A | 6/2005 |
| JP | 2007-023193 A | 2/2007 |
| JP | 2007-076365 A | 3/2007 |
| WO | 2004-018556 A1 | 3/2004 |
| WO | WO 2007010920 A1 * | 1/2007 |

OTHER PUBLICATIONS

Machine Translation of JP 2007-076365.*
Written Opinion of the International Search Authority for PCT/JP2008/052444.

* cited by examiner

*Primary Examiner* — Mark Kaucher
(74) *Attorney, Agent, or Firm* — Hoffmann & Baron, LLP (57) ABSTRACT

The present invention relates to resin pellets which comprises a thermoplastic resin (A) and an oxidation catalyst (B) which is not supported by any carrier, wherein if the peak area in the vicinity of 1715 $cm^{-1}$ is defined to be Ic and the peak area observed in the vicinity of 1470 $cm^{-1}$ is defined to be Im in the IR spectroscopic measurement of the pellets, the ratio: Ic/Im observed for the surface of the pellet is greater than that observed for the interior thereof. The pellets are thermoplastic resin pellets excellent in the oxygen-absorbing capacity and accordingly, they can suitably used as pellets for molding an oxygen absorptive resin article.

13 Claims, 2 Drawing Sheets

THERMOPLASTIC RESIN PELLETS AND METHOD FOR PREPARING SAME

CROSS-REFERENCE TO RELATED APPLICATIONS

This application is the National Stage of International Application No. PCT/JP2008/052444, filed Feb. 14, 2008, which claims the benefit of Japanese Application No. 2007-37584, filed Feb. 19, 2007, the contents of which are incorporated by reference herein.

FIELD OF THE INVENTION

The present invention relates to thermoplastic resin pellets which can suitably be used for forming an oxygen absorptive resin article such as a packaging material for packing contents, in particular, drinks or beverages, foods and medical and pharmaceutical products, which are quite liable to cause deterioration in the presence of oxygen and, in particular, pellets for forming an oxygen absorptive resin article and a method for the preparation of the same.

BACKGROUND OF THE INVENTION

As the packaging containers, there have recently been used various kinds of plastic containers because of their various advantages such as the light-weight properties, the high transparency and the easy moldability of the plastic material.

The plastic container is inferior in the oxygen-barrier properties as compared with the metallic container and the glass container and for this reason, a problem arises such that the contents packed in the plastic containers may undergo a change in quality and cause the reduction of the aromatic properties.

The plastic container is so designed that the wall of the container has a multi-layer structure which includes at least one layer composed of a resin excellent in the oxygen-barrier properties such as an ethylene-vinyl alcohol copolymer to solve the foregoing problem. Alternatively, there has also been known a container which is so designed that it comprises an oxygen-absorptive layer to remove oxygen which may remain in the container and/or the external oxygen which may transmit through the wall of the container. As oxygen absorptive agents (deoxidizing agents) used in the oxygen absorptive layer, there may be listed, for instance, those each mainly comprising a reducing substance such as iron powder (such as those disclosed in Patent Document 1 specified below); and those which make use of an oxygen-scavenger consisting of an ethylenically unsaturated hydrocarbon and a transition metal catalyst (such as those disclosed in Patent Documents 2 to 4 specified below).

However, such a method that an oxygen absorptive agent such as iron powder is incorporated into a resin and the resulting mixture is used for forming the wall of a packaging material is satisfied in that it has a high ability of absorbing oxygen, but this method has a restriction in the applications thereof such that it cannot be applied to the field of packaging materials which should satisfy the requirement of transparency for the purpose of coloring the resin with a particular tint or hue. Moreover, in the method which makes use of an oxygen scavenger consisting of an ethylenically unsaturated hydrocarbon and a transition metal catalyst, the ethylenically unsaturated hydrocarbon absorbs, by itself, oxygen to thus achieve the desired oxygen-barrier characteristics and therefore, it is necessary to increase, to some extent, the amount thereof to be incorporated into the resin, but a problem arises such that if the amount thereof to be added is too great, the moldability and transparency of the resulting resin material is inversely reduced. In addition, in case of these materials using a transition metal catalyst, another problem arises such that after the materials are formed into sheets and bottles, it takes a long period of time (induction time) till these articles initiate the absorption of oxygen.

Thus, there has been proposed a technique for shortening the induction time. For instance, Patent Document 5 discloses that the induction time of the oxygen absorption can be shortened by kneading a resin composition, which comprises a saturated thermoplastic resin such as hydrogenated styrene-butadiene resin and a transition metal catalyst, in the presence of oxygen. This technique uses, as such a catalyst, synthetic calcium silicate impregnated with a transition metal (or a transition metal supported on synthetic calcium silicate). If using such a catalyst supported on a carrier, however, a large amount of such a catalyst should be used to ensure a desired oxygen absorptive properties and this would adversely affects the characteristic properties of the resulting oxygen absorptive resin article. On the other hand, Patent Document 6 discloses that the oxygen-barrier characteristics can be improved when subjecting, to a heat treatment, a sheet or a container consisting of a resin composition which comprises a polyolefin, an oxidation catalyst and a radical-inhibitor in an amount ranging from 0 to 500 ppm.

Patent Document 1: J.P. KOKOKU Sho 62-1824;
Patent Document 2: JP-A-2001-39475;
Patent Document 3: JP-A-5-115776;
Patent Document 4: TOKUHYO Hei 8-502306;
Patent Document 5: JP-A-2004-269735;
Patent Document 6: JP-A-5-51049.

SUMMARY OF THE INVENTION

It is an object of the present invention to provide thermoplastic resin pellets which can suitably be used for forming an oxygen absorptive resin article and which are excellent in the ability of absorbing oxygen (oxygen-absorbing capacity).

It is another object of the present invention to provide a method for the preparation of the foregoing thermoplastic resin pellets, which can allow the efficient production of the same.

It is a further object of the present invention to provide an oxygen absorptive resin article excellent in the ability of absorbing oxygen.

The present invention has been completed on the basis of the following finding: If an oxidation catalyst which is not supported by any carrier and a thermoplastic resin are kneaded in the presence of oxygen, the oxidation reaction extremely proceeds to such an extent that the resin undergoes deterioration, but when resin pellets are formed through melt-kneading thereof in an oxidizing atmosphere and then the resulting pellets are treated in a specific oxidizing atmosphere while maintaining the remaining heat upon the formation of the pellets to thus make the pellets absorb oxygen, the foregoing problems can be solved.

More specifically, the present invention herein provides resin pellets which comprises a thermoplastic resin (A) and an oxidation catalyst (B) which is not supported by any carrier, wherein the peak area in the vicinity of 1715 $cm^{-1}$ is defined to be Ic and the peak area in the vicinity of 1470 $cm^{-1}$ is defined to be Im, in the IR spectroscopic measurement of the pellets, the ratio: Ic/Im observed for the surface of the pellet is greater than that observed for the interior thereof.

According to the present invention, there is also provided a method for the preparation of the foregoing pellets, which comprises the steps of melt-kneading a raw material comprising a thermoplastic resin (A) and an oxidation catalyst (B), which is not supported by any carrier, in a non-oxidizing atmosphere, then optionally cutting the resulting strand to thus form a resin strand or resin pellets; and then making the resulting strand or the pellets absorb oxygen in an oxidizing atmosphere of not less than 40° C., while maintaining the remaining heat upon molding them.

According to the present invention, there is further provided an oxygen absorptive resin article which comprises at least one layer formed from the foregoing thermoplastic resin pellets.

DETAILED DESCRIPTION OF THE INVENTION

The thermoplastic resin (A) used in the present invention is preferably a thermoplastic resin having an ethylenic structure in the molecular structure thereof and, in particular, a polyolefinic thermoplastic resin, for instance, a polyethylene such as a low density polyethylene, a medium density polyethylene, a high density polyethylene, a linear low density polyethylene, or a linear very low density polyethylene; a polypropylene such as an isotactic or syndiotactic polypropylene; an ethylenic copolymer such as an ethylene-propylene copolymer, a polybutene-1, an ethylene-butene-1 copolymer, an ethylene-propylene-butene-1 copolymer, an ethylene-vinyl acetate copolymer, or an ethylene-vinyl alcohol copolymer; a propylene-derived copolymer such as a propylene-butene-1 copolymer; an ionically crosslinked olefinic copolymer; or a blend thereof. In this respect, preferably used herein include, for instance, polyethylenes, polypropylenes, ethylene-propylene copolymers, ethylenic copolymers and propylene-derived copolymers.

Also usable herein as the thermoplastic resins each having an ethylenic structure in the molecular structure include, for instance, acid-modified olefinic resins each prepared by modifying one of the foregoing resins as a base polymer through the grafting thereof with an unsaturated carboxylic acid or a derivative thereof.

Moreover, the foregoing thermoplastic resin is preferably a resin which is obtained by the polymerization of a C2 to C20 monomer and which is substantially free of any ethylenically unsaturated bond. Furthermore, the foregoing thermoplastic resin is a linear low density polyethylene whose side chains consist of linear hydrocarbons in an amount of not higher than 0.003 eq/g, or a resin whose aliphatic side chains consist of a cyclic hydrocarbon which holds a part of the ring structure in common with the backbone, or consists of the foregoing cyclic hydrocarbons and linear hydrocarbons in combination, in a total amount of not higher than 0.005 eq/g. The term "side chain(s)" herein used means a molecular chain branched from the backbone of a resin and, in case of a linear hydrocarbon, if there is only one branch with respect to the backbone, the number of side chain is one. In case of a cyclic hydrocarbon such as one represented by the following chemical formula 1, there are two branches with respect to the backbone, but the entire cyclic compound is assumed to be a side chain and the number of side chain is thus defined to be 1. In addition the term "eq/g" appearing in the linear low density polyethylene whose side chains consist of linear hydrocarbons in an amount of not higher than 0.003 eq/g means the value obtained by determining the number of side chains present in 1 g of a resin and then dividing the number by the Avogadro's number and therefore, it may be calculated according to the equation: n/N, wherein N denotes the Avogadro's number and n denotes the number of side chains (those in the following description are shown in the same way also).

The aforementioned linear low density polyethylene used in pellets of the present invention can be obtained by selecting a monomer capable of forming linear side chains and copolymerizing the same with ethylene to thus form side chains consisting of linear hydrocarbons in an amount of not higher than 0.003 eq/g. If such linear hydrocarbons are thus formed as side chains, any molecular breakage at the branched portions of a resin can certainly be prevented unlike the resin carrying a side chain having a branch and this accordingly results in the control of the generation of any volatile low molecular weight component. Moreover, the progress of oxidation can be controlled by the intentional introduction, into the molecular chain, of a site including a tertiary carbon atom quite susceptible to oxidation to thus prevent the occurrence of any random molecular breakage possibly observed when a site comprising a secondary carbon atom is oxidized.

The foregoing polymerization may be properly selected one which makes use of a Ziegler-Natta catalyst or a single-site catalyst inasmuch as it can produce a resin having a desired molecular structure, but the polymerization using a single-site catalyst would permit the formation of a resin or copolymer whose variation in the copolymer composition can certainly be controlled over the entire molecular weight distribution. As a result, the resulting copolymer would have a quite uniform molecular structure and for this reason, the oxidation uniformly proceeds irrespective of the difference in the molecular chain. Accordingly, this is quite preferred since any excess side reaction is inhibited and the generation of any by-product through the oxidation due to the occurrence of any insignificant molecular breakage. The catalysts preferably used herein may be, for instance, metallocene catalysts. Also usable herein as such catalysts include, for instance, catalysts used for the polymerization of olefins which may serve as substitutes for the metallocene catalysts (post-metallocene catalysts), with phenoxy-imine catalysts (FI catalysts) being particularly suitably used herein. On the other hand, when the resin is polymerized using, for instance, a multi-site catalyst such as a Ziegler-Natta catalyst, other than the single-site catalyst, undesirable situations arise such that the copolymerization ratio between ethylene and comonomer would differ from molecular chain to molecular chain and that the oxidation of the copolymer is focused on a local site. Moreover, if the quantity of side chains branched from the backbone of a resin exceeds 0.003 eq/g, the backbone correspondingly includes an increased number of tertiary carbon atoms corresponding to the bound site of side chains, which is preferentially susceptible to oxidation, this in turn increases the frequency of the generation of low molecular weight molecules through the breakage of the backbone. More specifically, this becomes a cause of the generation of low molecular weight molecules which may adversely affect, for instance, the flavor of the contents of the ultimately formed container or the like.

The quantity of side chains preferably ranges from 0.0003 to 0.003 eq/g, and in particular, 0.0005 to 0.003 eq/g and the use of a resin whose quantity of side chains falls within the range is preferred in the present invention since the amount of the oxidation by-products can be reduced and this likewise permits the maintenance of the stable oxygen-absorbing characteristic properties and the stability to heat of the resulting copolymer.

Examples of the foregoing linear low density polyethylene preferably used herein are copolymers of ethylene and α-olefin obtained by the use of a metallocene type catalyst as the polymerization catalyst such as copolymers of ethylene and 1-butene, copolymers of ethylene and 1-hexene and copolymers of ethylene and 1-octene. These resins may be used alone or in any combination of at least two of them.

Moreover, methods for the preparation of the foregoing resins through polymerization, which make use of a single-site catalyst, are not restricted to specific ones inasmuch as they can be practiced in an industrial scale, but the method is preferably the liquid-phase technique since it has most widely been employed in this field.

On the other hand, the aforementioned resin whose aliphatic side chains consist of a cyclic hydrocarbon which holds a part of the ring structure in common with the backbone, or consists of the foregoing cyclic hydrocarbons and linear hydrocarbons in combination, in a total amount of not higher than 0.005 eq/g can be prepared by the copolymerization of ethylene and an alicyclic hydrocarbon having an ethylenically unsaturated bond, or the copolymerization of ethylene, an alicyclic hydrocarbon having an ethylenically unsaturated bond and a comonomer capable of forming a linear side chain.

In this resin, a cyclic hydrocarbon which holds a part of the ring structure in common with the backbone is bonded to the backbone and therefore, the cyclic portion is never separated from the resin unless the tertiary carbon atom present on the backbone is cleaved at two portions simultaneously. Accordingly, the oxidation by-products are formed only in a small amount as compared with the quantity of absorbed oxygen.

In addition, if forming a side chain having the shape denoted by the following chemical formula 1, any low molecular weight component as shown in the following scheme 1 is never formed when the tertiary carbon atom-containing portion present in the side chain is oxidized:

Chemical Formula 1:

Scheme 1:

The resin having these aliphatic cyclic side chains is liable to have a high glass transition point, but if the glass transition point is high, molecular chains undergo insufficient movement at ordinary temperature and the rate of absorbing oxygen is liable to be reduced. In this sense, the glass transition point can moderately be reduced through the use of a resin prepared by copolymerizing a proper amount of ethylene or by the copolymerization of a linear comonomer other than ethylene to thus form side chains of linear hydrocarbons. In this case, the side chains or those of the foregoing linear hydrocarbons are preferably ones having not less than 4 carbon atoms. The preferred glass transition point is not higher than 50° C.

In the resin whose aliphatic side chains each consist of a cyclic hydrocarbon which holds a part of the ring structure in common with the backbone, or consists of the foregoing cyclic hydrocarbons and linear hydrocarbons in combination, in a total amount of not higher than 0.005 eq/g, monomers having cyclic side chains may be block-copolymerized, random-copolymerized or alternately copolymerized, but the aliphatic cyclic side chain-carrying portions have such a tendency that the mobility of the molecules is reduced and therefore, it is preferred that they are, for instance, in the randomly copolymerized or alternately copolymerized states.

If the quantity of the foregoing aliphatic side chains bonded to the backbone exceeds 0.005 eq/g, the density of the tertiary carbon atoms present in the backbone is too high and this in turn leads to an increase in the frequency of the low molecular weight molecule-formation due to the breakage of the backbone. This likewise becomes a cause of the generation of low molecular weight molecules which may adversely affect, for instance, the flavor of the contents of the ultimately formed container or the like.

The amount of the aliphatic side chains suitably ranges from 0.0005 to 0.005 eq/g and in particular, 0.001 to 0.005 eq/g. This is preferred, since the use of such a resin, whose content of the aliphatic side chains falls within the range specified above, not only permits the reduction of the amount of the oxidation by-products, but also ensures the achievement of the stable oxygen-absorbing characteristic properties and the excellent stability to heat.

The resin comprising cyclic hydrocarbons, each of which holds a part of the ring structure in common with the backbone, or the resin comprising the foregoing cyclic hydrocarbons and linear hydrocarbons in combination is preferably prepared through the polymerization while using a single-site catalyst and a variety of copolymers can thus be produced and the microstructure of the resulting copolymer can likewise be controlled. The single-site catalyst suitably used herein may be, for instance, the foregoing metallocene catalyst and catalysts used for the polymerization of olefins which may serve as substitutes for the metallocene catalysts (post-metallocene catalysts). Specific examples of such catalysts are not restricted to those listed above, but usable herein also include those comprising Ti or Zr as a central metal and two indenyl groups as the ligands thereof and a combination of cyclopentadienyl group and benzo-indenyl group as the ligands thereof. Moreover, also preferably used herein include phenoxy-titanium type catalysts each comprising a combination of a cyclo-pentadienyl type ligand and a phenoxy type ligand. Examples of such resins each prepared through the use of a single-site catalyst and having cyclic side chains include cyclic olefin copolymers (APEL: available from Mitsui Chemical Co., Ltd.).

The foregoing resin which comprises cyclic hydrocarbons each of which holds a part of the ring structure in common with the backbone, or comprises the foregoing cyclic hydrocarbons and linear hydrocarbons in combination can be prepared by copolymerizing, for instance, ethylene and cyclobutene; ethylene and cyclopentene; ethylene and cyclohexane; or ethylene and cyclo-octene using a metallocene type single-site catalyst comprising zirconium as a central metal component. Moreover, linear and aliphatic side chains can be introduced into the resin by the use of an additional comonomer such as 1-butene, 1-hexene or 1-octene in addition to the foregoing two-component system. In addition, the copolymer thus prepared may have various structures such as block and random copolymeric sequences as has been described above by appropriately selecting the kind of catalyst to be used.

A resin carrying a desired number of side chains according to the present invention can be produced by appropriately controlling the compositional ratio of the foregoing copolymer.

In the foregoing cyclic hydrocarbon, a part of the hydrogen atoms constituting the hydrocarbon may be replaced with other atoms and/or atomic groups. Examples of such atomic groups are alkyl groups, aldehyde groups, carboxyl groups and hydroxyl group. For instance, in case of cyclohexene, monomers such as 3-cyclohexene-1-carboxy aldehyde, 3-cyclohexene-1-carboxylic acid and 3-cyclohexene-1-methanol are easily available as reagents. The substitution of a hydrogen atom with such an atomic group is preferably not more than one substituent per single side chain consisting of cyclic hydrocarbon.

When the substituted atomic group is polar in nature, it would be sufficient to appropriately select the kind of the central metal and the ligand of a catalyst used depending on the bulkiness and the magnitude of polarity of the molecule. As a catalyst for the copolymerization of ethylene and a methacrylate as a polar monomer, there has been known a metallocene type catalyst comprising Sm as the central metal and two cyclo-pentadienyl groups as ligands.

Side chains other than aliphatic ones, for instance, aromatic side chains such as phenyl groups may be present in the resin. In this case, however, the portion carrying such aromatic side chains is preferably present in the resin in the form of, for instance, styrene blocks.

Furthermore, it is also possible to blend the foregoing linear low density polyethylene resin which comprises side chains in an amount of not higher than 0.003 eq/g; with the resin whose aliphatic side chains consist of a cyclic hydrocarbon which holds a part of the ring structure in common with the backbone, or consists of the foregoing cyclic hydrocarbons and linear hydrocarbons in combination, in an amount of not higher than 0.005 eq/g.

It is preferred to use, as the foregoing thermoplastic resin, at least two polyethylene resins in combination from the viewpoint of the reduction of the amount of by-products formed, the improvement of the moldability and the improvement of the oxygen-absorbing properties. In particular, at least one polyethylene resin comprises a linear low density polyethylene prepared by copolymerizing ethylene and a 1-alkene having 3 to 6 carbon atoms in an amount of not less than 4% by mass. When using at least two kinds of linear low density polyethylenes each prepared by the copolymerization of ethylene and a 1-alkene having 3 to 6 carbon atoms in an amount of not less than 4% by mass, it is preferred to use at least two polyethylene resins having molecular weights different from one another. The difference in molecular weight between these polyethylene resins is preferably not less than $5.0 \times 10^2$, more preferably $5.0 \times 10^2$ to $3.0 \times 10^4$ and further preferably $5.0 \times 10^2$ to $2.0 \times 10^4$ as expressed in terms of the number average molecular weight. The foregoing 1-alkenes usable herein include, for instance, 1-propylene, 1-butene, 1-pentene, 1-hexene and mixture thereof, with 1-butene, 1-pentene and 1-hexene being preferably used in the invention. The 1-alkene having 3 to 6 carbon atoms is copolymerized with ethylene in an amount preferably ranging from 4 to 30% by mass and more preferably 4 to 20% by mass. The foregoing thermoplastic resin usable herein may be high-pressure-processed low density polyethylenes. When using two kinds of linear low density polyethylenes having molecular weights different from one another, the mixing ratio of the high molecular weight polyethylene to low molecular weight polyethylene preferably ranges from 5:5 to 9:1, more preferably 6:4 to 8:2 and further preferably 6:4 to 7:3. In addition, when using a blend of a linear low density polyethylene and a high-pressure-processed low density polyethylene, the mixing ratio of the linear low density polyethylene to the high-pressure-processed low density polyethylene preferably ranges from 5:5 to 9:1, more preferably 6:4 to 9:1 and further preferably 6:4 to 8:2. Moreover, the amount of the carbon-carbon double bonds present in the foregoing linear low density polyethylene and the high-pressure-processed low density polyethylene is not an item for quality control, but it is preferably not higher than $0.4 \times 10^{-4}$ eq/g.

In particular, the thermoplastic resin used herein is preferably one which can easily be extruded through an extruder without staying within the extruder during melting the resin with heating and which is excellent in the stability to heat. The term "a resin excellent in the stability to heat" herein used means a resin whose rate of weight loss on heating is low. More specifically, when subjecting the thermoplastic resin to the thermogravimetric analysis at a rate of temperature rise of 10° C./min and over the measuring temperature ranging from 30 to 300° C., the resin preferably has a rate of weight loss, on heating as determined at 250° C., ranging from 0 to 10% and more preferably 0 to 5%. Examples of such thermoplastic resins include polyethylenes (PE) such as low density polyethylenes (LDPE), medium density polyethylenes (MDPE), high density polyethylenes (HDPE), linear low density polyethylenes (LLDPE), and linear very low density polyethylenes (LVLDPE); polypropylenes (PP), ethylene-propylene copolymers, polybutene-1, ethylene-butene-1 copolymers, propylene-butene-1 copolymers, ethylene-propylene-butene-1 copolymers, ethylene-vinyl acetate copolymers, ionically crosslinked olefinic copolymers (ionomers) or blend thereof.

The oxidation catalyst used in the present invention is preferably a transition metal catalyst. As such a transition metal catalyst, preferably used herein include, for instance, the group VIII metal components in the periodic table such as iron, cobalt, and nickel and usable herein also include metal components, for instance, the group I metals such as copper and silver; the group IV metals such as tin, titanium and zirconium; the group V metals such as vanadium; the group VI metals such as chromium; and the group VII metals such as manganese. Among these metal components, the cobalt component can be particularly suitably used for the purpose of the present invention because of its high rate of oxygen-absorption.

The transition metal catalysts are in general used in the form of inorganic acid salts or organic acid salts or complex salts of the foregoing transition metals in their low valence states.

Examples of such inorganic salts include halides such as chloride; sulfur atom-containing oxy acid salts such as sulfates; nitrogen atom-containing oxy acid salts such as nitrates; phosphorus atom-containing oxy acid salts such as phosphates; and silicic acid salts.

On the other hand, examples of organic acid salts include carboxylic acid salts, sulfonic acid salts, and phosphonic acid salts, but carboxylic acid salts can be suitably used for the purpose of the present invention and specific examples thereof are transition metal salts of acetic acid, propionic acid, iso-propionic acid, butanoic acid, iso-butanoic acid, pentanoic acid, iso-pentanoic acid, hexanoic acid, heptanoic acid, iso-heptanoic acid, octanoic acid, 2-ethyl-hexanoic acid, nonanoic acid, 3,5,5-trimethyl-hexanoic acid, decanoic acid, neo-decanoic acid, undecanoic acid, lauric acid, myristic acid, palmitic acid, margaric acid, stearic acid, arachic acid, linderic acid, tsuzuic acid, petroselinic acid, oleic acid, linoleic acid, linolenic acid, arachidic acid, formic acid, oxalic acid, sulfamic acid, and naphthenic acid. Preferably used herein include, for instance, transition metal salts of neo-decanoic acid and stearic acid, with cobalt stearate being particularly preferred.

In the present invention, it is particularly preferred to use organic acid salts of transition metals.

On the other hand, as the complexes of transition metals, usable herein include complexes of transition metals with β-di-ketones or β-keto acid esters and specific examples of β-di-ketones or β-keto acid esters include acetyl acetone, ethyl acetoacetate, 1,3-cyclohexanedione, methylene-bis-1,3-cyclohexanedione, 2-benzyl-1,3-cyclohexanedione, acetyl-tetralone, palmitoyl-tetralone, stearoyl-tetralone, benzoyl-tetralone, 2-acetyl-cyclohexanone, 2-benzoyl-cyclohexanone, 2-acetyl-1,3-cyclohexanedione, benzoyl-p-chlorobenzoyl-methane, bis(4-methylbenzoyl)methane, bis(2-hydroxybenzoyl)methane, benzoylacetone, tri-benzoyl-methane, di-acetyl-benzoyl methane, stearoyl-benzoyl methane, palmitoyl-benzoyl methane, lauroyl-benzoyl methane, di-benzoyl methane, bis(4-chlorobenzoyl)methane, bis(methylene-3,4-dioxybenzoyl)methane, benzoyl-acetylphenyl methane, stearoyl-(4-methoxybenzoyl)methane, butanoyl-acetone, di-stearoyl methane, acetyl acetone, stearoyl acetone, bis(cyclohexanoyl)-methane and di-pivaloyl methane.

In the pellets of the present invention, the oxidation catalyst is preferably incorporated into the same in an amount ranging from 0.01 to 3% by mass and, in particular, 0.05 to 1% by mass on the basis of the mass of the thermoplastic resin (A). When using a transition metal catalyst as the oxidation catalyst, the oxidation catalyst is preferably included in the pellet in an amount ranging from 10 to 3000 ppm and, in particular, 50 to 1000 ppm as expressed in terms of the amount of the transition metal present therein on the basis of the thermoplastic resin (A). The use of the transition metal catalyst in an amount falling within the range specified above is preferred, since the oxidation catalyst can easily and uniformly be incorporated into the resin and the resulting resin composition can easily be formed into desired pellets without being accompanied by any trouble concerning the production thereof.

The oxidation catalyst (B) used in the present invention is one which is not supported by any carrier. If it is supported on a carrier, such a supported catalyst should be used a large amount and this accordingly makes it difficult to uniformly disperse the catalyst in the resulting pellets or oxygen absorptive resin article and this would in turn adversely affect the transparency and strength of these products.

According to the present invention, the resin pellets can be prepared using the foregoing thermoplastic resin (A) and oxidation catalyst (B), but a trigger resin (C) is preferably incorporated into the pellets. Such a trigger resin (C) per se can serve as a trigger for the oxidation to thus further efficiently accelerate the oxidation of the thermoplastic resin.

The trigger resin (C) herein used is preferably a resin having carbon-hydrogen bonds from which the hydrogen atom can extracted easier than the extraction of the hydrogen atom from the methylene chain and examples thereof include resins each having carbon-carbon double bonds in its backbone or side chains; resins each containing a tertiary carbon atom in its backbone; resins each having an activated methylene group in the backbone; and resins each carrying an aldehyde group. These trigger resins can be used alone or in any combination of at least two of them, in the foregoing thermoplastic resin.

The resin which can serve as a trigger resin having a carbon-carbon double bond in its backbone or side chain may be, for instance, a resin containing the units derived from a linear or cyclic, conjugated or unconjugated polyene. Specific examples of such monomers are conjugated dienes such as butadiene and isoprene; linear unconjugated dienes such as 1,4-hexadiene, 3-methyl-1,4-hexadiene, 4-methyl 1,4-hexadiene, 5-methyl-1,4-hexadiene, 4,5-dimethyl-1,4-hexadiene, and 7-methyl-1,6-octadiene; cyclic unconjugated dienes such as methyl tetrahydro-indene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, and dicyclopentadiene; and trienes such as 2,3-di-isopropylidene-5-norbornene, 2-ethylidene-3-isopropylidene-5-norbornene, and 2-propenyl-2,2-norbornadiene. Specific examples of polymers are polybutadiene, polyisoprene, ethylene-propylene-diene copolymer, polyterpene and dicyclopentadiene resins. It is preferred to use a resin having a tertiary carbon atom at the allyl-position from the viewpoint of the trigger effect and particularly preferred is a resin having, in the molecule, a cyclic alkene structure which has a tertiary carbon atom at the allyl-position, among others, since the amount of the generated oxidation by-products is small.

Such a resin suitably used herein and serving as the foregoing trigger resin which comprises a tertiary carbon atom in the backbone may be, for instance, a polymer or a copolymer containing units derived from an α-olefin having 3 to 20 carbon atoms; or a polymer or a copolymer having benzene rings in the side chains thereof Specific examples of the foregoing α-olefins include propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hepta-decene, 1-nonadecene, 1-eicosene, 9-methyl-1-decene, 11-methyl-1-dodecene, and 12-ethyl-1-tetradecene. Examples of specific polymers thereof are, in particular, polypropylene, poly-1-butene, poly-1-hexene, poly-1-octene, ethylene-propylene copolymer, ethylene-butene-1 copolymer, and ethylene-propylene-butene-1 copolymer. In addition, the foregoing monomer having a benzene ring on the side chain may be, for instance, an alkenyl benzene such as styrene, 3-phenyl-propene, or 2-phenyl-2-butene. Specific examples of polymers thereof include polystyrenes or styrene copolymers, styrene-butadiene copolymers and styrene-isoprene copolymers. The aromatic rings of these styrenic polymers each may have a substituent. In particular, preferably used herein as such substituents include, for instance, those each forming a resonance structure with the aromatic ring, such as those each having a non-covalent electron-pair or those each having polar multiple bond or those capable of undergoing hyper-conjugation.

The foregoing resin capable of serving as a trigger having activated methylene groups in the backbone is one having, in the backbone, an electron-attractive group, in particular, carbonyl group or a methylene group adjacent to the electron-attractive group and specific examples thereof include copolymers of carbon monoxide and olefins, in particular, carbon monoxide-ethylene copolymers.

Examples of the foregoing resins having aldehyde groups are those obtained by the radical-polymerization of monomers such as acrolein and methacrolein and copolymers thereof with styrene are also preferably used herein.

Resins capable of serving as the foregoing trigger resins and particularly preferably used herein are polystyrenes or styrene copolymers (in this specification, they are also referred to as "styrenic resin(s)") each having benzene rings on the side chains thereof while taking into consideration the function as a trigger for the oxidation of the foregoing thermoplastic resin.

The styrene copolymer preferably has a site derived from a diene from the viewpoint of the trigger effect. Examples of such sites derived from dienes are preferably ones each comprising isoprene units or butadiene units and, in particular, preferably used herein are copolymers of styrene and isoprene or butadiene and more specifically styrene-isoprene copolymers or styrene-butadiene copolymers. The copolymer may be in the form of a random copolymer or a block copolymer, but more preferably used herein is a block copolymer while taking into consideration the trigger effect and particularly preferably used herein is a styrene-isoprene block copolymer or a styrene-butadiene block copolymer having styrene blocks at the terminal portions of the molecule. Particularly preferably used herein are styrene-isoprene-styrene tri-block copolymers and styrene-butadiene-styrene tri-block copolymers. The foregoing tri-block copolymers may have any chemical structures such as linear or radial structures.

Copolymers obtained by moderately hydrogenating the diene-derived sites of the foregoing styrene copolymers having such diene-derived sites are particularly preferably used herein since the use thereof would permit the inhibition of any deterioration and coloration possibly observed when the resin is molded into a desired article. The diene-derived site is preferably isoprene units or butadiene units and, in particular, such a styrene copolymer preferably used herein is a hydrogenated styrene-isoprene copolymer or a hydrogenated styrene-butadiene copolymer, which is a hydrogenated product of a copolymer of styrene and isoprene or butadiene. The styrene copolymer may be in the form of a random copolymer or a block copolymer, but more preferably used herein is a block copolymer while taking into consideration the trigger effect thereof and particularly preferably used herein is a styrene-isoprene block copolymer or a styrene-butadiene block copolymer having styrene blocks at the terminal portions of the molecule. Particularly preferred are hydrogenated styrene-isoprene-styrene tri-block copolymers and hydrogenated styrene-butadiene-styrene tri-block copolymers. The foregoing tri-block copolymers may have any chemical structures such as linear or radial structures and the carbon-carbon double bond in the diene-derived site prior to the hydrogenation thereof may be present as a vinylene group in the backbone of the resin or as a vinyl group on the side chain thereof.

In this respect, the random copolymers may be, for instance, hydrogenated styrene-isoprene random copolymers and hydrogenated styrene-butadiene random copolymers.

Alternatively, other forms of the styrene copolymers which are also useful herein and whose diene-derived sites are appropriately hydrogenated include, for instance, hydrogenated styrene-diene-olefin (crystalline) tri-block copolymers and, in particular, hydrogenated styrene-butadiene-olefin (crystalline) tri-block copolymers are preferred since the formation of any oxidation by-product may be inhibited in this case. Hydrogenated styrene-butadiene-polyethylene tri-block copolymers are preferred among others.

Moreover, regarding the resins each having carbon-carbon double bonds in its backbone or side chains, the resins each containing a tertiary carbon atom in its backbone, and the resins each having an activated methylene group in the backbone, which have been listed above as examples of the foregoing resins capable of serving as trigger resins for the oxidation, the foregoing resins each capable of serving as a trigger are liable to suppress the oxidation of the thermoplastic resin, if they contain a large number of carbon-carbon double bonds. In this connection, however, the carbon-carbon double bonds present within the benzene ring are not referred to as the foregoing carbon-carbon double bonds in the meaning of the present invention.

The molecular weight of the resin capable of serving as a trigger is not restricted to any specific one, but it preferably ranges from 1,000 to 500,000 and more preferably 10,000 to 250,000 as expressed in terms of the number average molecular weight while taking into consideration the dispersibility thereof in the foregoing thermoplastic resin.

From the viewpoint of the improvement of the oxygen-absorbing rate, it is preferred to use, as the foregoing styrenic resin, a resin (C1) and a resin (C2), in combination, which have styrene contents different from one another. In this connection, the styrene content of the resin (C1) preferably ranges from 60 to 90% by mass and more preferably 60 to 70% by mass. On the other hand, that of the resin (C2) is preferably not higher than 50% by mass and more preferably 10 to 40% by mass and further preferably 10 to 30% by mass. Moreover, the difference in the styrene content between the resin (C1) and the resin (C2) is preferably not less than 20% by mass, more preferably 20 to 60% by mass and further preferably 30 to 60% by mass. The resin (C1) is preferably a hydrogenated product of a copolymer of styrene and isoprene or butadiene or a hydrogenated styrene-isoprene copolymer or a hydrogenated styrene-butadiene copolymer, with hydrogenated styrene-butadiene-styrene tri-block copolymer being particularly preferably used herein. The resin (C2) is preferably a hydrogenated product of a copolymer of styrene and isoprene or butadiene or a hydrogenated styrene-isoprene copolymer or a hydrogenated styrene-butadiene copolymer. In particular, preferably used herein include hydrogenated styrene-butadiene-styrene tri-block copolymers, hydrogenated styrene-butadiene random copolymers and hydrogenated styrene-butadiene-polyethylene tri-block copolymers. The mixing ratio of the resin (C1) and the resin (C2) preferably ranges from 1:9 to 9:1, more preferably 2:8 to 8:2 and further preferably 3:7 to 5:5.

The aforementioned thermoplastic resin (A) is preferably incorporated into the composition for forming pellets in a large amount which permits the formation of a matrix and the absorption of a large quantity of oxygen through oxidation thereof and accordingly, the thermoplastic resin pellets according to the present invention comprise the thermoplastic resin in a total content more preferably ranging from 90 to 99% by mass and further preferably 92.5 to 97.5% by mass. In addition, the foregoing resin (C) capable of serving as the trigger for the oxidation is preferably incorporated into the resin composition in a small rate such that the resin (C) can sufficiently show its function as the trigger for the oxidation of the thermoplastic resin and the content of the resin (C) capable of serving as the trigger preferably ranges from 1 to 10% by mass and more preferably 2.5 to 7.5% by mass while taking into consideration the moldability of the resulting resin composition which becomes important when the composition is formed into a film, a sheet, a cup, a tray, a bottle, a tube or a cap.

An activator known per se can, if desired, be incorporated into the thermoplastic resin pellets used in the present invention, although the use thereof is not always required. Examples of such activators suitably used herein include, but are not limited to hydroxyl group-containing and/or carboxyl group-containing polymers such as polyethylene glycol, polypropylene glycol, ethylene-methacrylic acid copolymers and various kinds of ionomers.

Further the following known additives for resins can likewise be incorporated into the thermoplastic resin pellets used in the present invention according to any formulation known per se: For instance, a filler, a coloring agent, a heat stabilizer, a weathering agent, an antioxidant other than phosphorus atom-containing one, anti-aging agent, a light stabilizer, a UV absorber, an antistatic agent, a lubricating agent such as a metal soap and a wax, and a resin or rubber for quality-modification.

For instance, the incorporation of a lubricating agent into the pellets would permit the improvement of the bite of the resin into the screw. Examples of such lubricating agents generally used herein are metal soap such as magnesium stearate and calcium stearate; those consisting of hydrocarbons such as liquid, naturally occurring or synthetic paraffins, micro waxes, polyethylene waxes and chlorinated polyethylene waxes; fatty acid-containing ones such as stearic acid and lauric acid; fatty acid mono-amide type or bis-amide type ones such as stearic acid amide, palmitin acid amide, oleic acid amide, esylic acid amide, methylene-bis-stearamide, and ethylene-bis-stearamide; ester type ones such as butyl stearate, hardened castor oil and ethylene glycol mono-stearate; alcohol type ones such as cetyl alcohol and stearyl alcohol; and mixed systems comprising the same.

In this respect, however, some of the foregoing additives may inhibit the oxidation reaction to thus extend the induction time of the oxidation and accordingly, these additives should be added in a required smallest amount. Examples of such substances which may inhibit the oxidation reaction in the present invention include basic compounds.

The thermoplastic resin pellets of the present invention is characterized in that if the peak area in the vicinity of 1715 $cm^{-1}$ is defined to be Ic and the peak area in the vicinity of 1470 $cm^{-1}$ is defined to be Im, observed when carrying out the IR spectroscopic measurement of the surface and interior of the pellets, the ratio: Ic/Im observed for the surface of the pellet is greater than that observed for the interior thereof.

In this connection, the IR measuring apparatus used herein is preferably Fourier transform infrared spectrophotometer (FTIR). For instance, preferably used is FTS7000 manufactured and sold by VARIAN Company.

The IR spectroscopic measurement of the surface of pellets can be carried out by directly measuring the IR spectra thereof. On the other hand, the IR spectroscopic measurement of the interior of pellets can be carried out by, for instance, cutting a pellet at the center thereof and then measuring the IR spectra thereof on the section thus exposed.

The peak area observed in the vicinity of 1715 $cm^{-1}$ on the resulting IR spectrogram can be specified to be one falling within the wavelength range of from 1675 to 1770 $cm^{-1}$, while the peak area observed in the vicinity of 1470 $cm^{-1}$ can be specified to be one falling within the wavelength range of from 1390 to 1500 $cm^{-1}$. The peak in the vicinity to 1715 $cm^{-1}$ can be ascribed to carbonyl group and it would be believed that this indicates the degree of progress of the oxygen-absorption reaction.

It is necessary in the present invention that, in respect of the ratio: Ic/Im which is determined using the peak observed in the vicinity of 1470 $cm^{-1}$ originated from methylene group as the standard, the ratio observed for the surface of the pellet is greater than that observed for the interior thereof, the former is preferably greater, by not less than 0.01, than that observed for the latter and more preferably the ratio observed for the former is greater, by not less than 0.05, than that observed for the latter. The upper limit of the difference of the ratio is preferably 1.0 and more preferably 0.8. Moreover, it is desirable that the ratio observed for the interior of the pellet is less than 0.05.

It is preferred in the present invention that the degree of the oxidation observed for the pellet surface is higher than that observed for the interior thereof. This is because if the oxidation proceeds even to the interior of the pellet, a problem arises such that the oxidation reaction proceeds to an extremely high degree and this in turn results in the deterioration of the resin and the increased contamination of the contents of the finally prepared article with the scorching.

Furthermore, when carrying out the IR spectroscopic measurement of the pellet surface, the IR spectral information on the part of the pellet situating at different depths from the surface of the pellet can be obtained by variously changing the kind of ATR crystal plate used. For instance, when using a diamond plate, the IR spectral information on a deeper portion thereof can be obtained, while if using a germanium plate, the IR spectral information on a shallower portion thereof can be obtained. In the present invention, it is accordingly preferred that the area ratio: Ic/Im observed using a diamond plate is greater than that observed using a germanium plate and more preferably, the difference in the ratio between them is not less than 0.01. The upper limit of the difference is preferably 0.3.

The fact that the area ratio: Ic/Im observed using a germanium plate is greater than that observed using a diamond plate would suggest that only the quite shallower portion of the surface area of the pellet is excessively oxidized and a problem accordingly arises such that the exterior of a container ultimately prepared from the resin composition causes yellowing as will be detailed in connection with a laminate-structured container produced in the following Examples.

The pellets of the present invention can easily be prepared by melt-kneading a raw material comprising a thermoplastic resin (A) and an oxidation catalyst (B) which is not supported by any carrier in a non-oxidizing atmosphere, forming the molten raw material into a resin strand and optionally cutting the resulting strand into resin pellets; and then making the resulting strand or the pellets absorb oxygen in an oxidizing atmosphere of not less than 40° C. The upper limit of the temperature of the oxidizing atmosphere is preferably 70° C. and more preferably 65° C.

In this respect, an example of the non-oxidizing atmosphere used herein is preferably a nitrogen gas atmosphere such as the nitrogen gas stream. In addition, the melt-kneading operation is preferably carried out using a twin-screw extruder.

Moreover, it is preferred in the present invention that a core portion is first formed starting from a thermoplastic resin (A) and an oxidation catalyst (B) which is not supported by any carrier using a twin-screw extruder and then a cover portion is formed on the core portion using a thermoplastic resin (A) to thus give pellets each having a central body-sheath structure or a core-shell structure. The pellets having such a structure would permit the effective prevention of the occurrence of any deterioration, denaturation and/or coloration of the oxidation catalyst (B). At this stage, the central body (core): sheath (or shell) ratio by weight preferably ranges from 10:90 to 90:10 and more preferably 50:50 to 90:10.

The method for making the resulting pellets absorb oxygen in an oxidizing atmosphere of not less than 40° C. is preferably one which comprises the step of allowing, to stand, the pellets in an oxidizing atmosphere such as an oxygen gas atmosphere or in the air at a temperature of not higher than the softening point of the pellets to thus make the pellets absorb oxygen. For instance, pellets may be treated by introducing them into a hopper-dryer for drying raw materials, circulating hot air preferably maintained at a temperature ranging from 45 to 65° C. and particularly preferably 50 to 60° C. through the hopper-dryer and allowing the pellets to stand under such a condition over a time period preferably ranging from 12 to 72 hours and more preferably 15 to 30 hours, but it is more preferred to make the pellets absorb oxygen by storing them in a surge tank or a silo at a temperature of not less than 40° C., while maintaining the remaining heat upon molding them from the viewpoint of, for instance, the prevention of any excess oxidation and the inhibition of the occurrence of yellowing possibly observed on the pellet surface, the reduction of the processing time and the energy-conservation.

The term "the state in which the remaining heat upon molding is maintained" used in the present invention means the state of the pellets or the strand which do not completely lose the heat applied to and/or generated during molding the same and the term does not encompass the state of the pellets or the strand which are allowed to stand within a room after the molding of the same and as a result, the internal temperature thereof reaches room temperature. Moreover, the temperature of the surface of these pellets or strands is preferably not less than 25° C. and more preferably not less than 40° C.

More specifically, the temperature of the pellets preferably ranges from 50 to 80° C. when introducing them into, for instance, surge tank and it is not less than 40° C. when withdrawing them from the surge tank. In this respect, it is a matter of course that hot air may be circulated using, for instance, a hopper-dryer to thus positively control the temperature of the pellets. The retention time of this oxygen-absorbing step preferably ranges from 1 to 6 hours and more preferably 1 to 3 hours. Thus, it is suitable to make the pellets absorb oxygen in an amount of not less than 0.2 ml/g and preferably 0.2 to 1.2 mL/g, after the formation of the pellets.

The shape of the pellets of the present invention is not restricted to any specific one, but specific examples thereof include various shapes such as spherical, hemispherical, column-like, prism-like, cylindrical, Go Stone-like, and Rugby ball-like shapes. Preferably used herein are spherical shaped pellets since they can easily be prepared. Moreover, the size of the pellets is not likewise restricted to any particular one, but it preferably ranges from 2 to 10 mm and more preferably 3 to 8 mm from the viewpoint of the easiness of the production thereof.

The thermoplastic resin pellets according to the present invention can be used for the oxygen-absorption in the sealed package without any further post-treatment or after forming into a desired shape. Alternatively, the pellets may be incorporated into a resin or rubber for forming a liner, a gasket, or a coating to thus use the same for the absorption of oxygen remaining in a package. Furthermore, these pellets can be formed into a film and a sheet for use as a packaging material or further they can be used for forming a packaging body and they can be formed into, for instance, a packaging container such as a cup, a tray, a bottle, a tube-like container; or a cap.

The thermoplastic resin pellets according to the present invention are preferably used in the form of a multi-layer structure comprising at least one layer (hereunder referred to as "oxygen absorptive layer") formed from the pellets and a layer formed from a different resin.

The materials for forming the resin layer other than the oxygen absorptive layer, which constitutes such a multi-layer structure can properly be selected from thermoplastic resins or thermosetting resins, while taking into consideration the mode of the use of the resulting multi-layer structure and the functions required for the same. Examples of such materials are olefinic resins, thermoplastic polyester resins, and oxygen-barrier resins.

Examples of the aforementioned olefinic resins include polyethylene (PE) such as low density polyethylene (LDPE), medium density polyethylene (MDPE), high density polyethylene (HDPE), linear low density polyethylene (LLDPE), and linear very low density polyethylene (LVLDPE); polypropylene (PP); ethylene-propylene copolymer; poly-butene-1; ethylene-butene-1 copolymer; propylene-butene-1 copolymer; ethylene-propylene-butene-1 copolymer; ethylene-vinyl acetate copolymer; ionically crosslinked olefinic copolymer (ionomers); or blends thereof.

In addition, examples of the foregoing thermoplastic polyester resins include polyethylene terephthalate (PET), polybutylene terephthalate (PBT), polyethylene naphthalate (PEN), polyglycolic acid-based polyester resins, or copolymeric polyesters thereof, and blends thereof.

Examples of the foregoing oxygen-barrier resins are ethylene-vinyl alcohol copolymers (EVOH). There may be used herein, for instance, saponified copolymer prepared by subjecting, to the saponification, an ethylene-vinyl acetate copolymer which has an ethylene content ranging from 20 to 60% by mole and preferably 25 to 50% by mole in such a manner that the resulting product has a degree of saponification of not less than 96% by mole and preferably not less than 99% by mole.

This saponified ethylene-vinyl alcohol copolymer has a molecular weight sufficient for forming a film. In general, it has a viscosity of not less than 0.01 dl/g and preferably not less than 0.05 dl/g as determined at 30° C., using a solution thereof in a 85:15 (weight ratio) mixed phenol/water solvent.

Other examples of the foregoing oxygen-barrier resins usable herein include polyamide resins such as poly(meth-axylidene adipamide) (MXD6); polyglycolic acid-based polyester resins; and blends of these polyester resins with other polyester resins.

The structure of the foregoing multi-layered body can properly be selected depending on the mode of using the multi-layer structure and the functions required for the same. Specific examples of such structure include those listed below, while abbreviating the oxygen absorptive layer as "OAR":

Bi-layer Structure: PET/OAR, PE/OAR, PP/OAR;
Tri-layer Structure: PE/OAR/PET, PET/OAR/PET, PE/OAR/OPP, EVOH/OAR/PET, PE/OAR/COC, PP/OAR/PET, PP/OAR/PP, PP/OAR/COC;
Tetra-layer Structure: PE/PET/OAR/PET, PE/OAR/EVOH/PET, PET/OAR/EVOH/PET, PE/OAR/EVOH/COC,

PE/OAR/EVOH/PE, PP/PET/OAR/PET, PP/OAR/EVOH/PET, PP/OAR/EVOH/COC;

Penta-layer Structure: PET/OAR/PET/OAR/PET, PE/PET/OAR/EVOH/PET, PET/OAR/EVOH/COC/PET, PET/OAR/PET/COC/PET, PE/OAR/EVOH/COC/PET, PE/EVOH/OAR/EVOH/PE, PP/PET/OAR/EVOH/PET, PP/OAR/EVOH/COC/PET, PP/EVOH/OAR/EVOH/PP;

Hexa-layer Structure: PET/OAR/PET/OAR/EVOH/PET, PE/PET/OAR/COC/EVOH/PET, PET/OAR/EVOH/PET/COC/PET, PE/EVOH/OAR/PE/EVOH/PE, PP/PET/OAR/COC/EVOH/PET, PP/EVOH/OAR/PP/EVOH/PP; and Hepta-layer Structure: PET/OAR/COC/PET/EVOH/OAR/PET.

In this respect, PE represents low density polyethylene (LDPE), medium density polyethylene (MDPE), high density polyethylene (HDPE), linear low density polyethylene (LLDPE), and linear very low density polyethylene (LVLDPE). When using PE or PP as a material for an intermediate layer, the PE or PP layer may be a regrind resin composition-containing layer of the multi-layer structure according to the present invention. The foregoing regrind resin composition includes those containing the scrap resin generated when carrying out the molding of the multi-layer container of the present invention and it in general comprises a resin mixture of the scrap resin and a virgin resin such as an olefinic resin constituting the multi-layer container while taking into consideration the moldability thereof. In addition, a deodorizing agent or an adsorbent may be incorporated into the regrind resin composition.

Among the structures described above, one comprising at least one oxygen-barrier layer is preferred since the lifetime of the oxygen absorptive layer can be improved.

In this laminate, a layer of an adhesive resin may, if necessary, be arranged between the neighboring layers. Examples of such adhesive resins include those derived from carboxylic acids, carboxylic acid anhydrides or polymers each having, in the backbone or on side chains, carboxyl groups in a concentration ranging from 1 to 700 meq per 100 g of the resin and preferably 10 to 500 meq per 100 g of the resin.

Specific examples of such adhesive resins are ethylene-acrylic acid copolymers, ionically crosslinked olefinic copolymers, maleic anhydride-grafted polyethylenes, maleic anhydride-grafted polypropylenes, acrylic acid-grafted polyolefins, ethylene-vinyl acetate copolymers, copolymerized polyesters, and copolymerized polyamides, which may be used in combination of at least two of them.

These adhesive resins are useful when laminating the foregoing multi-layer structure through the co-extrusion technique or the sandwich-lamination technique. Moreover, an isocyanate type or epoxy type thermosetting adhesive resin may likewise be used in the adhesive layer for combining a preliminarily formed gas-barrier resin film and a moisture-resistant resin film.

In the laminate which makes use of the thermoplastic resin pellets according to the present invention, a deodorizing agent or an adsorbent (for absorbing oxidation by-products) (also referred to as "an agent for trapping oxidation by-products" in this specification) is preferably used in either of the foregoing layers constituting the laminate, in particular, the layers situating on the inside of the oxygen absorptive layer, for the purpose of trapping the by-products generated when the oxygen absorptive layer absorbs oxygen.

Examples of such agents for trapping oxidation by-products include those known per se such as naturally occurring zeolite, synthetic zeolite, silica gel, activated carbon, impregnated active carbon, activated china clay, activated aluminum oxide, clay, diatomaceous earth, kaolin, talc, bentonite, sepiolite, attapulgite, magnesium oxide, iron oxide, aluminum hydroxide, magnesium hydroxide, iron hydroxide, magnesium silicate, aluminum silicate, synthetic hydrotalcite, and amine-supporting porous silica. Among them, amine-supporting porous silica is preferred from the viewpoint of the reactivity with aldehyde as an oxidation by-product and so-called high silica zeolite having a high silica/alumina ratio is preferably used because of its excellent adsorptivity to a variety of oxidation by-products and high transparency. The high silica zeolite preferably has a silica/alumina ratio of not less than 80, more preferably not less than 90 and further preferably 100 to 700. The zeolite having such a high silica/alumina ratio has properties such that the ability of trapping oxidation by-product thereof is rather improved under such a high humidity condition that the adsorptivity of the zeolite having a low silica/alumina ratio is reduced. Accordingly, this substance is particularly effective when using the same in a package which contains moisture-rich contents. The ion-exchanging cation of the high silica zeolite should be at least one member selected from the group consisting of alkali metals such as sodium, potassium and lithium; and alkaline earth metals such as calcium and magnesium. In this respect, it is preferred that the high silica zeolite includes, as such an ion-exchanging cation, at least sodium ions and, in particular, substantially all of the ion-exchanging cations present therein are preferably sodium ions. As such high silica zeolite, particularly preferred is ZSM-5 Type Zeolite. In addition, it is also important that the high silica zeolite is in the form of a pomegranate fruit-like structure formed through the agglomeration of fine particles of the zeolite. This pomegranate fruit-like structure would result in an increase of the adsorptive surface area and such a structure can serve to effectively adsorb even an organic compound having a size greater than that simply predicted on the basis of the pore size of the zeolite. The zeolite used in the present invention preferably has an average pore size ranging from 0.5 to 10 μm.

Specific examples of the multi-layer structures preferably used in the present invention include a multi-layer structure comprising the following 10 layers in the order from the outside thereof: outermost layer/adhesive layer/gas-barrier resin layer/adhesive layer/oxygen absorptive layer/oxidation by-product-trapping agent-containing layer/adhesive layer/gas-barrier resin layer/adhesive layer/innermost layer. Furthermore, preferably used in the present invention is a multi-layer structure in which the layer containing an agent for trapping oxidation by-products comprises a regrind resin composition.

The aforementioned multi-layer structure can be prepared by a method known per se. For instance, it is sufficient to carry out the usual extrusion molding process while using a plurality of extruders the number of which is proportional to the kinds of resins used and using a multiple layer-extrudable multiple die.

In addition, it is also possible to produce the multi-layer structure of the present invention according to the co-injection molding technique or the successive injection technique using a plurality of injection molding machines the number of which corresponds to the kinds of resins used to thus form a multilayer injection-molded article.

Moreover, the film or sheet can be prepared from the multi-layer structure of the present invention according to the extrusion-coating technique and the sandwich-lamination technique. Alternatively, a multi-layer film or sheet can likewise be prepared by the dry-lamination technique using a film formed in advance.

The packaging materials such as a film can be used as packaging bags having a variety of shapes and such bags can be produced according to the bag-making method known per se and examples of such bags include, but are not restricted to, three side-sealed or four side-sealed usual pouches, gusseted pouches, standing pouches, and pillow type packaging bags.

The packaging container produced using the multi-layer structure of the present invention is useful as a container capable of preventing the reduction of any flavor of the contents thereof due to the action of oxygen.

Examples of such contents which can be packed in such containers include, but are not restricted to, contents accommodated in the packaging containers, which are quite susceptible to oxygen and correspondingly undergo deterioration, for instance, drinks such as beer, wine, fruit juices, carbonated soft drinks, oolong tea, and green tea; foods such as fruits, nuts, vegetables, meat products, foods for infants, coffee, jam, mayonnaise, ketchup, edible oils and fats, dressings, sauces, foods boiled down in soy, and dairy products; and others such as medicinal agents, cosmetic products, and gasoline.

The foregoing packaging containers may further be wrapped with an outer packaging body to thus give a wrapped article.

Then the present invention will be described below with reference to the following Examples and Comparative Examples, but the present invention is not restricted to these specific Examples at all.

EXAMPLES

Example 1

Preparation of Pellets for Molding Oxygen Absorptive Resin Article

There were dry-blended 0.26% by mass of tablet-like cobalt stearate (available from Dainippon Ink and Chemicals, Inc.) as an oxidation catalyst, 2.51% by mass of a hydrogenated styrene-butadiene-styrene copolymer (TUFTEC P2000 available from Asahi Chemicals K.K.) and 2.51% by mass of a hydrogenated styrene-butadiene-styrene copolymer (DYNARON 8601P, available from JSR K.K.) as trigger resins, and 23.71% by mass of a Ziegler-Natta catalyst-polymerized linear low density polyethylene LLDPE (NEOZEX 20201J, available from Mitsui Chemical Co., Ltd.) (LLDPE-A) and 71.01% by mass of a single-site catalyst-polymerized linear low density polyethylene LLDPE (EVORUE SP0511, available from Mitsui Chemical Co., Ltd.) (LLDPE-B) as base resins in a tumbling mixer, followed by the introduction of the resulting blend into a twin-screw extruder (manufactured and sold by Toshiba Machine Co., Ltd.) through its hopper. The resulting mixture was melt-kneaded at a resin temperature of 200° C. and at a delivery rate of 100 kg/h, while nitrogen gas was continuously fed to the extruder for purging the same through the bottom of the hopper and the extruder was evacuated to a vacuum to prevent the oxidation/thermal deterioration of the blend during kneading the same and then the blend was extruded into a strand through the die of the extruder. The resulting strand was passed through a water bath maintained at a temperature ranging from 30 to 40° C. to thus adjust the surface temperature of the strand to 70° C. and then the strand thus cooled was cut into pellets in a pelletizer to thus give column-shaped pellets each having an outer diameter ø ranging from 2.0 to 3.0 mm and a length ranging from 3.0 to 4.0 mm. The resulting pellets were continuously introduced into a surge tank (the maximum charge: 250 kg) through the upper introduction port, 20 kg each of pellets were withdrawn from the discharge port positioned at the bottom thereof every 12 minutes after the elapse of 132 minutes from the introduction and wrapped up with an aluminum-crafted bag to thus give final pellets. The surface temperature of the pellets upon the withdrawal thereof from the tank was found to be 50° C.

Example 2

A resin blend was extruded into a strand through a die using the same resin composition used in Example 1 and under the same extrusion conditions likewise used in Example 1, the strand was passed through a water bath maintained at a temperature of 25° C. to thus adjust the surface temperature of the strand to 25° C. and then the strand thus cooled was cut into pellets in a pelletizer to thus give column-shaped pellets each having an outer diameter φ ranging from 2.0 to 3.0 mm and a length ranging from 3.0 to 4.0 mm. Then 200 kg of the resulting pellets were introduced into a hopper-dryer available from KAWATA K.K. (the maximum charge: 250 kg; flow rate: 240 m$^3$) whose temperature was set at 50° C., the resin pellets were maintained therein for 20 hours, while they were circulated at a rate of 2 kg/min, they were withdrawn from the discharge port arranged at the bottom thereof and then wrapped up with an aluminum-crafted bag to thus give final pellets.

Then FTIR spectra were determined on the surface of the final pellets thus obtained and on the section thereof obtained by cutting the central portion of the column-like pellet with a cutter. The area ratio: Ic/Im was calculated from the resulting FTIR spectra and the results are summarized in the following Table 1. Further, the ultimately obtained pellets were inspected for the ability of absorbing oxygen (or the oxygen-absorbing capacity) and the results thus obtained are plotted on FIG. 2 attached hereto.

Comparative Example 1

The pellets were prepared by repeating the same procedures used in Example 2 except that the resulting pellets were not subjected to the heat-circulation treatment using a hopper-dryer available from KAWATA K.K. and the pellets were used as the final product.

Then FTIR spectra were determined on the surface of the final pellets prepared in Examples 1 and 2 and Comparative Example 1 and on the sections thereof each obtained by cutting the central portion of the column-like pellet with a cutter. In this connection, the FTIR spectra were determined according to the method specified below:

Spectrum-Determination with Fourier Transform Infrared Spectro-Photometer (FTIR)

The FTIR spectra of the surface and section (interior) of the pellet were determined using FTS7000 available from VARIAN Company according to the Single Bounce ATR technique. Two kinds of ATR crystal plates were used. More specifically, one of them was a diamond plate in which the light from the sample surface can get into a deeper region of the pellet (1.18 μm for a light beam of 1715 cm$^{-1}$) and the other was a germanium plate in which the light can get into only a shallow region of the pellet (0.41 μm for a light beam of 1715 cm$^{-1}$). Moreover, in the FTIR spectrogram, the peak area near 1715 cm$^{-1}$ (1705 to 1725 cm$^{-1}$) showing the absorption by carbonyl groups was defined to be Ic, while the peak area near 1470 cm$^{-1}$ (1460 to 1480 cm$^{-1}$) showing the absorption by methylene groups was defined to be Im, and the area ratio: Ic/Im was thus calculated.

Separately, the final pellets prepared in Examples 1 and 2 and Comparative Example 1 were inspected for the ability of absorbing oxygen (Oxygen-Absorbing Capacity) according to the following method:

Evaluation of Oxygen-Absorbing Capacity of Oxygen Absorptive Resin Pellets

To an oxygen-impermeable container [HIGH-RETOFLEX: HR78-84, or a cup-shaped laminate container made of polypropylene/stainless steel foil/polypropylene available from Toyo Seikan Kaisha, Ltd.] having an inner volume of 84 cc, there was added 3.0 g of pellets, and then the container was heat-sealed with a capping material comprising polypropylene (inner layer)/aluminum foil/polyester (outer layer). The sealed container was stored at a temperature of 30° C. for 24 hours and thereafter, the oxygen concentration of the contents of the container was determined according to the gas chromatography technique.

Figure 1:
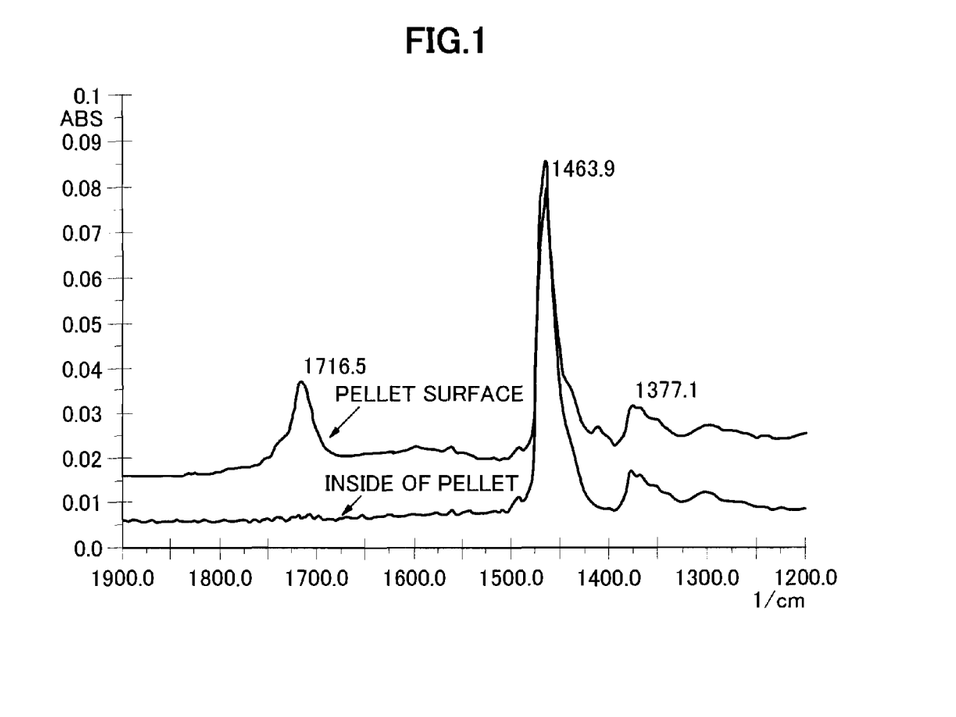
FIG. 1: This figure shows FTIR (Fourier transform infrared spectra) observed for the surface and section (interior) of pellets.

Moreover, the resulting FTIR spectrogram is shown in FIG. 1 attached herein. The area ratio: Ic/Im was calculated on the basis of the FTIR spectra obtained from the spectrogram. In addition, the results thus obtained are summarized in the following Table 1.

TABLE 1

Area Ratio obtained from FTIR Spectrogram:

| Ex. No. | Ic/Im for Pellet Surface | | Ic/Im for Interior of Pellet | |
|---|---|---|---|---|
| | Diamond | Germanium | Diamond | Germanium |
| 1 | 0.624 | 0.459 | 0.008 | 0.005 |
| 2 | 0.571 | 0.644 | 0.007 | 0.002 |
| 1* | 0.007 | 0.008 | 0.007 | 0.003 |

Figure 2:
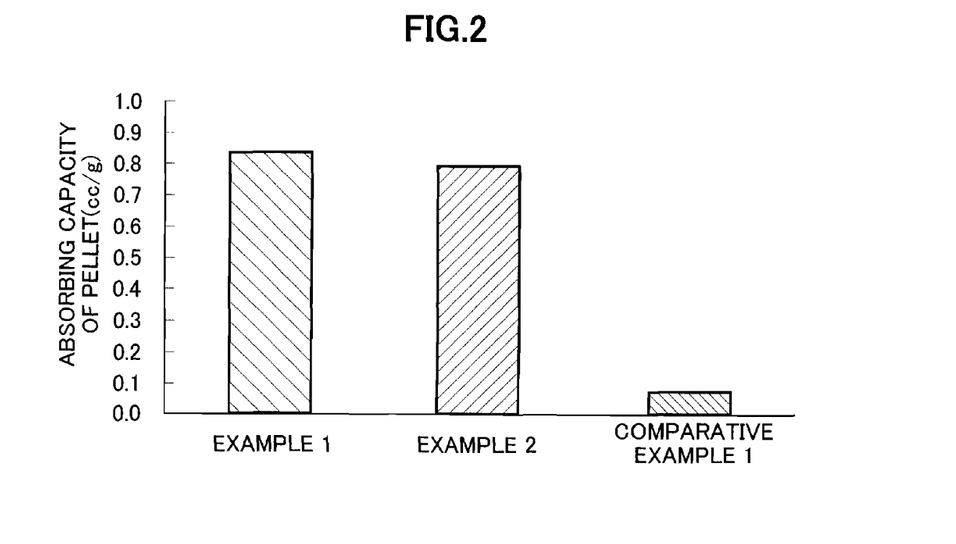
FIG. 2: This figure shows the oxygen-absorbing capacity of pellets.

FIG. 2 shows the results obtained in the measurement of the oxygen-absorbing capacity carried out using the final pellets prepared in Examples 1 and 2 and Comparative Example 1.

In addition, an oxygen absorptive resin container was molded using each of the final pellets prepared in Examples 1 and 2 and Comparative Example 1 according to the following method and the oxygen-absorbing capacity thereof was determined.

Production of Laminated Container

There was prepared a laminate container comprising the following 10 layers of 5 kinds of materials according to the blow molding technique: LDPE (SUMIKASEN F108-2: Sumitomo Chemical Co., Ltd.)/adhesive material (MODOCK AP L522: Mitsubishi Chemical Co., Ltd.)/gas-barrier resin layer (EVAR F10113: Kuraray Co., Ltd.)/adhesive layer/layer formed from thermoplastic resin pellets/layer of regrind resin composition/adhesive layer/gas-barrier resin layer/adhesive layer/LDPE (SUMIKASEN F108-2: Sumitomo Chemical Co., Ltd.), in the order from the outside. The resulting container was found to have an internal volume of 415 mL and a weight of 17.7 g.

Evaluation of Oxygen-Permeability of Container

The interior of the container was replaced with nitrogen gas to an oxygen concentration of not higher than 0.01%, a small amount of water was introduced into the container and then the container was sealed. The container thus obtained was stored under the conditions of 30° C.-80% RH and thereafter, the amount of oxygen present in the container was determined by the gas chromatography technique to thus calculate the increase in the oxygen concentration.

Figure 3:
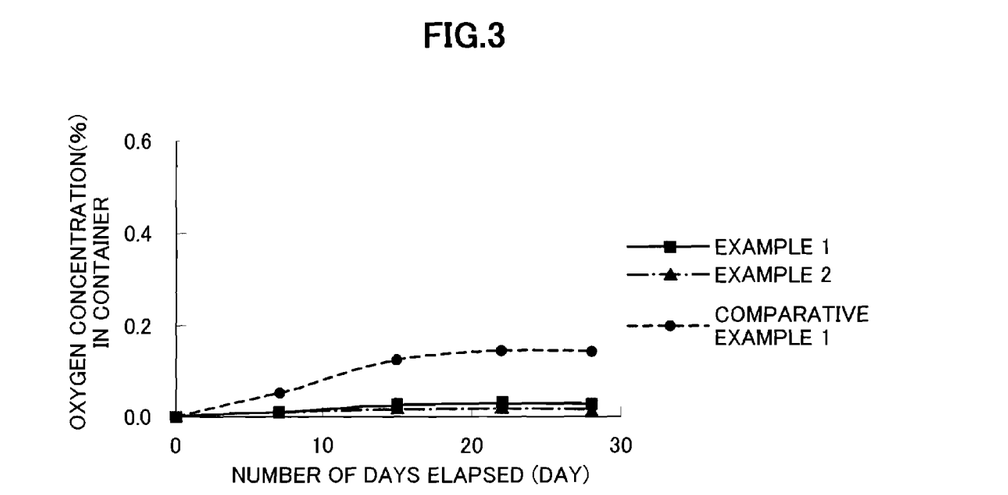
FIG. 3: This figure shows the change, with time, of the oxygen-absorbing capacity observed for the container molded from the pellets prepared in Examples 1 and 2 and Comparative Example 1.

The results thus obtained are plotted on FIG. 3.

Furthermore, the appearance of the bottle (Hunter color difference b-value) was examined according to the following method:

A section having a size of 3 cm×3 cm was cut out from the trunk wall of the foregoing laminate container and the color difference b-value was determined using spectroscopic calorimeter SE-2000 (available from Nippon Denshoku Industry Co., Ltd.). The results thus obtained are plotted on FIG. 4 attached hereto.

Figure 4:
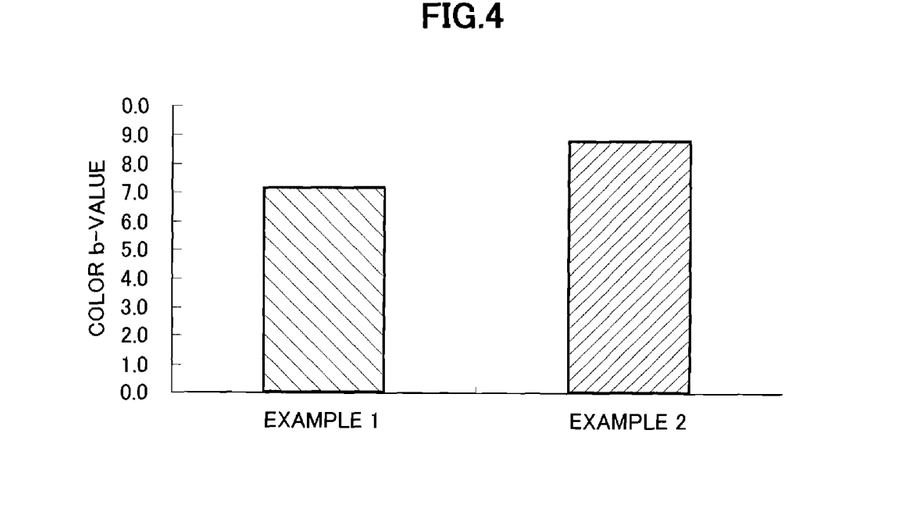
FIG. 4: This figure shows the appearance (Hunter color difference b-value) of the bottle molded using the pellets prepared in Examples 1 and 2.

The data plotted on FIG. 4 clearly indicate that the color change observed when using the pellets prepared in Example 1 is smaller than that observed when using the pellets prepared in Example 2.

What is claimed is:

1. Resin pellets which comprise a thermoplastic resin (A) and an oxidation catalyst (B) which is not supported by any carrier, wherein if the peak area in the vicinity of 1715 $cm^{-1}$ is defined to be Ic and the peak area in the vicinity of 1470 $cm^{-1}$ is defined to be Im in the IR spectroscopic measurement of the pellets, the ratio: Ic/Im observed for the surface of the pellet is greater, by not less than 0.01, than that observed for the interior thereof, wherein the surface of the pellets is strongly oxidized as compared with the inside of the pellets, the resin pellets being prepared by melt-kneading a raw material comprising a thermoplastic resin (A) and an oxidation catalyst (B) which is not supported by any carrier in a non-oxidizing atmosphere, forming the molten raw material into a resin strand and optionally cutting the resulting strand into resin pellets; and then making the resulting strand or the pellets absorb oxygen (i) in an oxidizing atmosphere of not less than 40° C. for 1 to 6 hours.

2. The pellets as set forth in claim 1, wherein the thermoplastic resin (A) is a polyolefinic resin.

3. The pellets as set forth in claim 1, wherein the thermoplastic resin (A) is a linear low density polyethylene LLDPE.

4. The pellets as set forth in claim 2, wherein the thermoplastic resin (A) is one prepared using a single site catalyst.

5. The pellets as set forth in claim 1, wherein the oxidation catalyst (B) is a salt of a transition metal with an organic acid.

6. The pellets as set forth in claim 1, wherein the pellets comprise the oxidation catalyst (B) in an amount ranging from 0.01 to 3% by mass on the basis of the thermoplastic resin (A).

7. The pellets as set forth in claim 1, wherein the peak areas Ic and Im are determined using a Fourier transform infrared spectrophotometer (FTIR) equipped with an ATR crystal plate made of diamond.

8. The pellets as set forth in claim 1, wherein the pellets further include a trigger resin (C).

9. The pellets as set forth in claim 8, wherein the trigger resin (C) is a styrenic resin.

10. The pellets as set forth in claim 8, wherein the trigger resin (C) is a hydrogenated styrene-butadiene-styrene copolymer.

11. The pellets as set forth in claim 8, wherein the pellets comprise the trigger resin (C) in an amount ranging from 1 to 10% by mass.

12. An oxygen absorptive resin article comprising at least one layer formed from thermoplastic resin pellets as set forth in claim 1.

13. The method for the preparation of resin pellets comprising a thermoplastic resin (A) and an oxidation catalyst (B) which is not supported by any carrier, wherein if the peak area in the vicinity of 1715 $cm^{-1}$ is defined to be Ic and the peak area in the vicinity of 1470 $cm^{-1}$ is defined to be Im in the IR spectroscopic measurement of the pellets, the ratio: Ic/Im observed for the surface of the pellet is greater, by not less than 0.01, than that observed for the interior thereof, wherein the surface of the pellets is strongly oxidized as compared with the inside of the pellets, which comprises the steps of melt-kneading a raw material comprising a thermoplastic resin (A) and an oxidation catalyst (B) which is not supported by any carrier in a non-oxidizing atmosphere, then optionally cutting the resulting strand to thus form a resin strand or resin pellets; and then making the resulting strand or the pellets absorb oxygen in an oxidizing atmosphere of not less than 40° C. for 1 to 6 hours, while maintaining the remaining heat upon molding them.

\* \* \* \* \*